(12) United States Patent
Muirhead

(10) Patent No.: US 8,347,794 B2
(45) Date of Patent: *Jan. 8, 2013

(54) FIRE RESISTANT PALLET

(75) Inventor: Scott A. W. Muirhead, Surrey (CA)

(73) Assignee: Nextreme, LLC, Uniontown, PA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/802,769

(22) Filed: Jun. 14, 2010

(65) Prior Publication Data

US 2010/0251941 A1  Oct. 7, 2010

Related U.S. Application Data

(63) Continuation of application No. 10/798,932, filed on Mar. 11, 2004, now Pat. No. 7,735,430.

(51) Int. Cl.
*B65D 19/38* (2006.01)
*G08B 26/00* (2006.01)

(52) U.S. Cl. .................................. 108/57.25; 340/505

(58) Field of Classification Search ............... 108/57.25, 108/57.27, 57.28, 901, 902, 51.11; 248/346.02; 206/386, 597, 598; 340/572.1, 505, 825.49, 340/825.36; 705/28; 700/1; 425/135, 137, 425/169

See application file for complete search history.

(56) References Cited

U.S. PATENT DOCUMENTS

| | | | |
|---|---|---|---|
| 3,695,188 A | 10/1972 | Granatstein | 108/58 |
| 3,719,157 A | 3/1973 | Arcocha et al. | 108/51 |
| 3,757,704 A | 9/1973 | Allgeyer et al. | 108/51 |
| 3,810,862 A | 5/1974 | Mathis et al. | 260/42.45 |
| 4,220,100 A | 9/1980 | Palomo et al. | 108/51.1 |
| 4,428,306 A | 1/1984 | Dresen et al. | 108/53.3 |
| 4,606,278 A | 8/1986 | Shuert | 108/51.1 |
| 4,649,007 A * | 3/1987 | Bonis et al. | 108/57.25 |
| 4,727,102 A * | 2/1988 | Scarso | 524/100 |
| 4,879,956 A | 11/1989 | Shuert | 108/53.3 |
| 5,117,762 A | 6/1992 | Shuert | 108/51.1 |
| 5,143,778 A | 9/1992 | Shuert | 428/213 |
| 5,197,395 A | 3/1993 | Pigott et al. | 108/56.1 |
| 5,205,221 A | 4/1993 | Melin et al. | 108/51.3 |
| 5,356,983 A | 10/1994 | Vijayendran et al. | 524/416 |
| 5,367,960 A | 11/1994 | Schleicher | |
| 5,391,251 A | 2/1995 | Shuert | 156/292 |
| 5,401,347 A | 3/1995 | Shuert | 156/245 |

(Continued)

FOREIGN PATENT DOCUMENTS

DE    10024421    11/2001

(Continued)

OTHER PUBLICATIONS

Brindley, Chaille, "Going Up in Smoke", Industrial Reporting, Inc., Oct. 1, 2001.

(Continued)

*Primary Examiner* — Jose V Chen
(74) *Attorney, Agent, or Firm* — Price & Adams

(57) ABSTRACT

An industrial platform for material handling, such as a plastic pallet, is constructed of three scuffed thermoplastic sheets, including exterior intumescent polymeric surfaces for resisting the spread of combustion flames and insulating the interior surfaces from the high temperature of fire. The pallet is reinforced with optional rigidifying structures without article modification. Pallet members are joined with snap together features providing an assembled article. The pallet includes handles for ergonomic manipulation by workers and is readily adapted to receive a number of unitization accessories for enhancing material handling operations.

22 Claims, 8 Drawing Sheets

U.S. PATENT DOCUMENTS

| | | | |
|---|---|---|---|
| 5,404,829 A | 4/1995 | Shuert | 108/51.1 |
| 5,408,937 A | 4/1995 | Knight, IV et al. | 108/55.5 |
| 5,413,052 A | 5/1995 | Breezer et al. | 108/56.1 |
| 5,555,820 A | 9/1996 | Shuert | 108/51.1 |
| 5,566,624 A | 10/1996 | Brown et al. | 108/51.1 |
| 5,638,760 A | 6/1997 | Jordan et al. | 108/51.1 |
| 5,648,031 A | 7/1997 | Sturtevant et al. | 264/80 |
| 5,676,064 A | 10/1997 | Shuert | |
| 5,687,532 A | 11/1997 | Torrey | 52/656.3 |
| 5,687,652 A * | 11/1997 | Ruma | 108/57.25 |
| 5,728,424 A | 3/1998 | Walling | 427/180 |
| 5,758,855 A | 6/1998 | Jordan et al. | 248/346.01 |
| 5,806,436 A | 9/1998 | Weichenrieder, Sr. et al. | 108/57.23 |
| 5,834,535 A | 11/1998 | Abu-Isa et al. | 523/179 |
| 5,845,588 A | 12/1998 | Gronnevik | |
| 5,924,589 A | 7/1999 | Gordon | 220/23.91 |
| 5,946,878 A | 9/1999 | Grund et al. | 52/630 |
| 5,984,126 A | 11/1999 | Gordon | 220/62.22 |
| 5,989,706 A | 11/1999 | McGinniss et al. | 428/341 |
| 6,006,677 A | 12/1999 | Apps et al. | |
| 6,029,583 A | 2/2000 | LeTrudet | 108/57.25 |
| 6,095,787 A | 8/2000 | Bills, Sr. | 425/215 |
| 6,109,190 A | 8/2000 | Hale et al. | 108/57.25 |
| 6,110,559 A | 8/2000 | De Keyser | 428/68 |
| 6,138,582 A | 10/2000 | Fujii et al. | |
| 6,184,269 B1 | 2/2001 | Abu-Isa et al. | 523/179 |
| 6,228,914 B1 * | 5/2001 | Ford et al. | 524/124 |
| 6,344,508 B1 * | 2/2002 | Endo et al. | 525/437 |
| 6,352,039 B1 * | 3/2002 | Woods et al. | 108/57.25 |
| 6,357,366 B1 | 3/2002 | Frankenberg | 108/57.25 |
| 6,389,990 B1 | 5/2002 | Apps | 108/57.25 |
| 6,395,342 B1 * | 5/2002 | Kadowaki et al. | 427/434.2 |
| 6,458,232 B1 | 10/2002 | Valentinsson | 156/182 |
| 6,718,888 B2 * | 4/2004 | Muirhead | 108/57.25 |
| 6,742,460 B2 * | 6/2004 | Meyer et al. | 108/57.25 |
| 6,758,148 B2 | 7/2004 | Torrey et al. | |
| 6,784,234 B2 | 8/2004 | Adedeji et al. | 524/140 |
| 6,849,677 B2 | 2/2005 | Overholt | |
| 7,037,576 B2 | 5/2006 | Willham et al. | |
| 7,252,041 B2 * | 8/2007 | Overholt et al. | 108/57.28 |
| 7,735,430 B2 * | 6/2010 | Muirhead | 108/57.25 |
| 7,779,763 B2 * | 8/2010 | Valentinsson | 108/57.25 |
| 7,874,256 B2 * | 1/2011 | Muirhead | 108/57.25 |
| 2001/0031807 A1 * | 10/2001 | Adedeji et al. | 108/901 |
| 2002/0175435 A1 * | 11/2002 | Weiland et al. | 264/45.1 |
| 2003/0032702 A1 * | 2/2003 | Medoff et al. | 524/13 |
| 2005/0004281 A1 | 1/2005 | Adedeji et al. | 524/115 |
| 2006/0011108 A1 * | 1/2006 | Abu-Isa et al. | 108/57.25 |
| 2006/0236903 A1 | 10/2006 | Moore | 108/57.25 |
| 2008/0141912 A1 | 6/2008 | Valentinsson | |
| 2008/0143514 A1 | 6/2008 | Valentinsson | |

FOREIGN PATENT DOCUMENTS

| | | |
|---|---|---|
| EP | 0400640 | 12/1990 |

OTHER PUBLICATIONS

Catastrophic Fire Prevention Task Force, Progress Report on Appropriate Use of Plastic Pallets, undated publication, p. 1-2.

Electronics Industry Pallet Specification Draft Updated Sep. 6, 2001, p. 8.

English language version of the abstract for German Patent Document No. DE10024421 downloaded from www.espacenet.com on Feb. 2, 2007.

Extreme™ Pallet, General Electric Company Publication brochure GID-PAL-120 2 pages.

Witt, Clyde E., "Jumping Through Plastic Hoops of Fire", Material Handling Management, Oct. 2002.

McGrath and Ghassemi, "The Syntheisis and Characterization of New Thermoplastic Fire Resistant Materials", May 4, 1997.

"Fire and Polyvinyl Chloride", The Vinyl Institute, 1996, pp. 1-16.

Catastrophic Fire Prevention Task Force, Progress Report on Appropriate Use of Plastic Pallets, undated publication p. 1-2.

Electronics Industry Pallet Specification Draft Updated Sep. 6, 2001. p. 8.

* cited by examiner

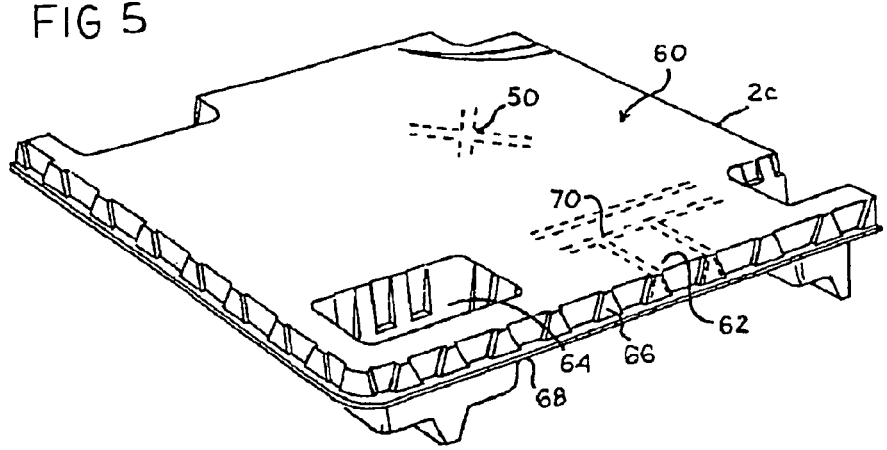
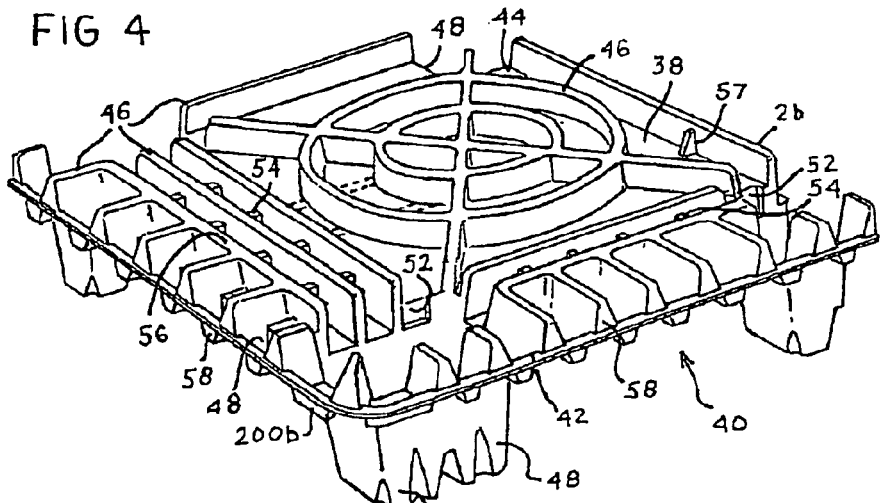
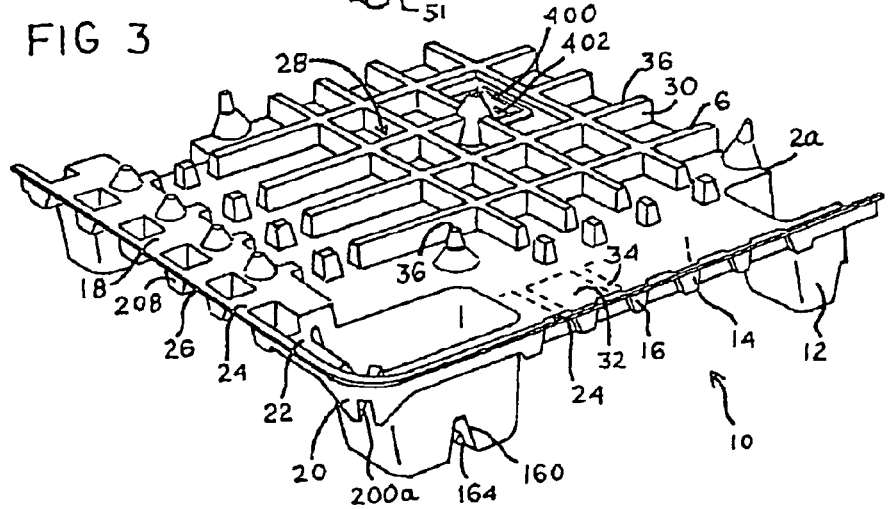

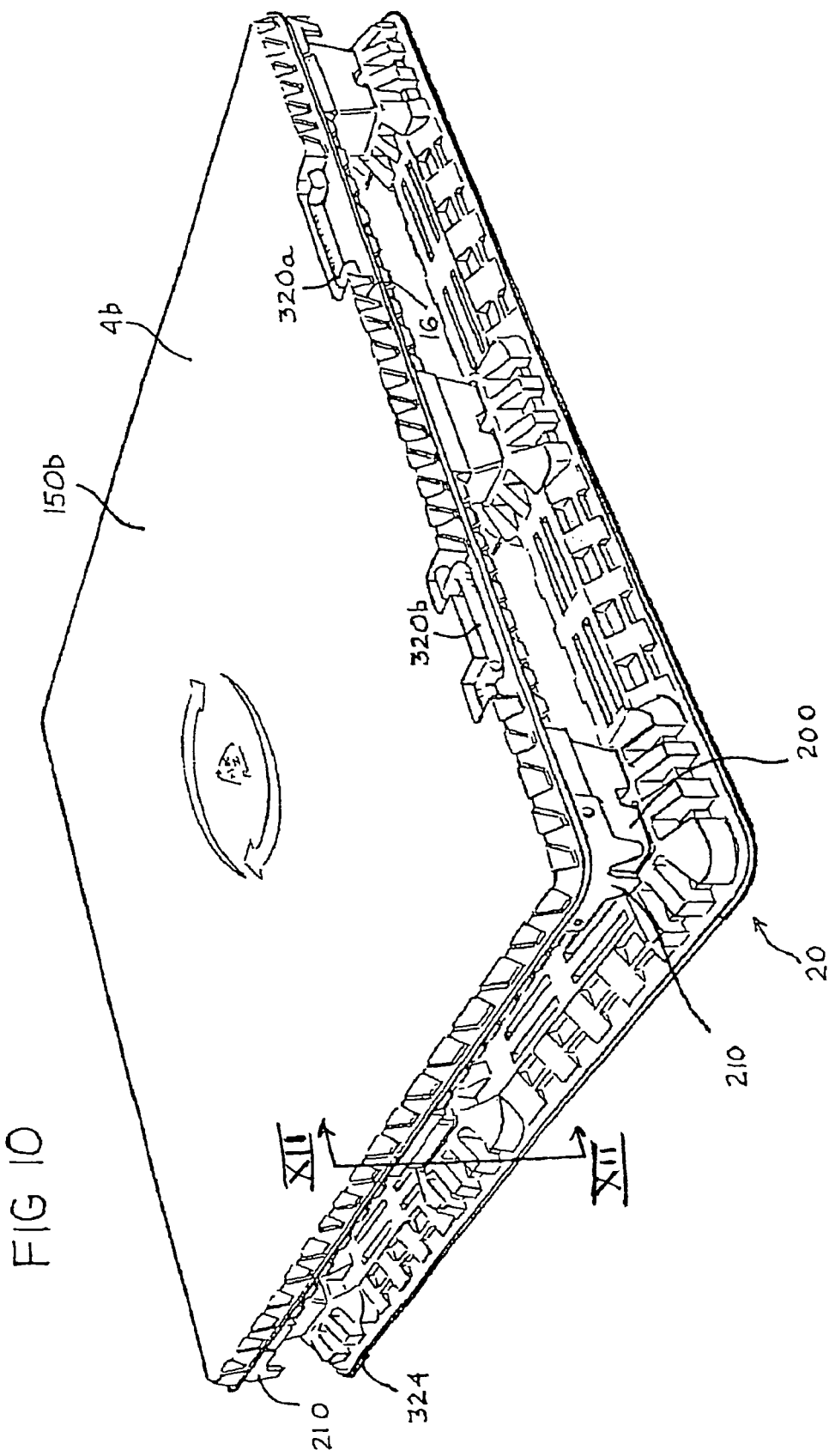

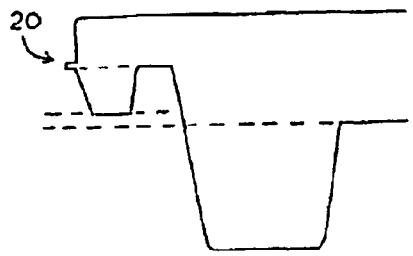
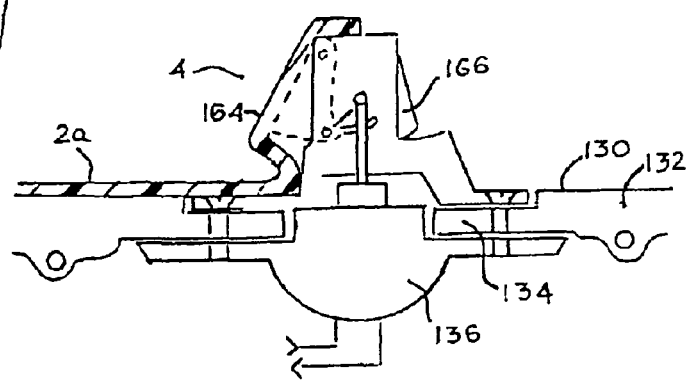
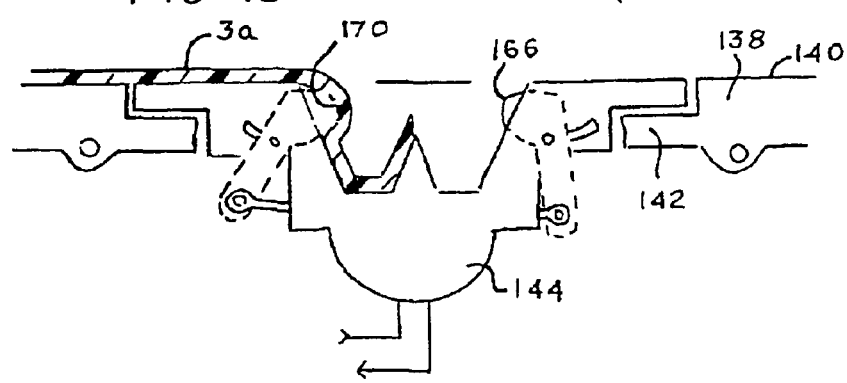
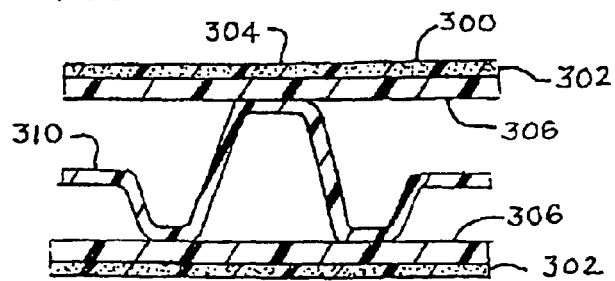

FIRE RESISTANT PALLET

CROSS-REFERENCE TO RELATED APPLICATIONS

This application is a continuation of U.S. patent application Ser. No. 10/798,932 filed on Mar. 11, 2004, now U.S. Pat. No. 7,735,430 which claims the benefit of U.S. patent application Ser. No. 09/803,681 filed on Mar. 12, 2001, now U.S. Pat. No. 6,718,888 which claims the benefit of U.S. Provisional Application No. 60/196,127, filed on Apr. 11, 2000. The disclosures of the above applications are incorporated herein by reference.

BACKGROUND OF THE INVENTION

1. Field of the Invention

This invention relates to industrial platforms and, more particularly, to plastic pallets having intumescent properties that provide the pallets with fire resistance characteristics.

2. Description of the Prior Art

Wooden stringer pallets are the preferred materials of pallet construction within the North American distribution system. Four hundred (400) million new or refurbished wooden pallets are introduced into a distribution system comprising 1.9 billion pallets each year, according to the US Forest Service.

Plastic pallets have been used to replace wood pallets with some degree of success over the past several years. Plastic pallets have a low market share however because they suffer from one significant disadvantage in that they are considerably more expensive than a comparable wooden pallet. Thermoplastic materials constitute a significant proportion of the total cost of a plastic pallet, and a given amount of relatively expensive plastic material is required to produce a pallet with a measure of load-bearing strength that is comparable to wooden pallets. Therefore, the plastics industry is attempting to overcome the initial price difference that exists between wooden and plastic pallets, so that the plastics industries can gain more market share.

Approximately 4 to 6 percent of the annual North American production of pallets are in the form of plastic pallets. Increasing the strength while utilizing less material is an important object of the plastics industry. The plastic industry however has reached a plateau. Only marginal, rather than significant break through in increased strength to weight ratios have been anticipated using conventional methods of the plastics industry.

The twin sheet thermoforming sector of the plastics industry has captured a share of the plastic pallet market disproportionate to its share of the overall plastics industry. Accordingly, it may be suggested that the art of thermoforming is a competitively and comparatively advantageous starting point for the development of new break through plastic pallet methodologies.

The "standard" 48×40-inch wooden stringer pallet has a dynamic load bearing performance specification of 2,800 pounds. This load bearing specification is the benchmark against which plastic pallets are compared. In order to meet this specification in thermoformed plastic, a combination of two (×2) twin sheet pallet members have been proposed. Two twin sheet members are combined to provide what in known in the material handling industry as a rackable plastic pallet.

Conventional rackable twin sheet pallet designs comprise a load supporting platform and a load-distributing base. Three common techniques are used by thermoforming practitioners to join the load supporting platform and the load distributing base in a fixed spaced apart relationship for the introduction of fork lift tines and the like for movement and storage of the plastic pallet within the distribution system.

A first method characterized in U.S. Pat. No. 5,413,052 to Breezer et al., utilizes a plurality of separately molded blocks to maintain the twin sheet members forming the deck and the base of the pallet a fixed distance apart. A second method characterized in U.S. Pat. No. 5,117,762 to Shuert suggests a load supporting platform with a plurality of depending legs to maintain the twin sheet pallet members a fixed distance apart. In yet another method, two pallet members are fused together where corresponding mirror image projecting elements upon each member come together, as in U.S. Pat. No. 5,401,347 to Shuert.

Each method characterized presents problems. In the first methodology, an undesirable plurality of mechanical fasteners and molded elements are required. In the second method, the load-bearing surface of the platform has pockets forming the leg projections, which reduces the surface area available for supporting a load. In the third method, where the two members are fused together, the arrangement is disadvantageously permanent. These approaches are not satisfactory. A low cost means of coupling and de-coupling the members of a racking style pallet is needed.

In order to meet the 2,800-pound load bearing benchmark it has also been necessary to encapsulate metal frame structures between the twin sheets comprising the thermoformed pallet members. U.S. Pat. No. 5,404,829 to Shuert illustrates in FIG. 7 how the top sheet of thermoplastic forming the load support deck includes elements that depend downward from the surface to capture reinforcing beams.

In the U.S. Pat. No. 5,413,052 execution of a reinforced pallet no depending elements on the load-bearing surface are suggested. A substantially uninterrupted surface is preferred over a relatively stronger developed surface having several pockets or depressions. The deck member of '052 would however be unsatisfactory for supporting loads without the reinforcing cross members because this structure would be considerably weaker than a deck with a developed surface structure. Accordingly, a mold combination that can produce either a strong non-reinforced or an exceptionally strong reinforced pallet without interruptions on the load-supporting surface would be advantageous and is therefor needed.

Plastic pallets must also provide a level of fire resistance that is at least equal to or better than wooden pallets should a fire occur within the warehouse setting. Plastic pallets will not substitute wooden pallets on a large scale if plastic pallets create hazards that prevent a fire from being extinguished. A plastic pallet that creates more fire hazards than a wooden pallet will necessitate fire protection upgrades, including increased sprinkler systems and insurance premiums that could become very costly to the plastic pallet user. According to this problem, one pallet known as the GE Extreme™ Pallet has been offered.

The GE Extreme™ Pallet is UL classified and Factory Mutual approved to meet the National Fire Code (NFPA 13) for commodity and idle storage of pallets. Although this particular plastic pallet has been used to some advantage, it is nonetheless heavy weight (approx. 57.5 pounds) and is constructed of plastic materials made from expensive General Electric Company Noryl® and Xenoy® resins. The problem is that these resins are considerably more expensive than the commodity resins of the olefin group such as polyethylene and polypropylene, which are the preferred materials for constructing low cost plastic pallets.

A number of methodologies have been used in the past to provide fire retardant polyolefin compositions, as for example in electrical wiring. These prior art methods may be known by referring to U.S. Pat. No. 3,810,862 to Mathis et al, U.S. Pat. No. 5,356,983 to Vijayendran et al. and U.S. Pat. No. 5,946,878 to Grund et al. A first problem with these methods is that the materials are relatively expensive as they are used throughout the article's resinous composition. A second problem is the resultant loss of the physical properties and general processability of the carrier resin forming the article.

Coatings have also been proposed to provide protective fire retardant properties to plastic structural articles, and may be understood by referring to U.S. Pat. No. 5,924,589 to Gordon and U.S. Pat. No. 6,110,559 to De Keyser. An intumescent coating system comprising a first layer providing a breakthrough barrier and a second layer providing thermal insulation has also been proposed, as in U.S. Pat. No. 5,989,706 to McGinniss et al. Problems with coating systems are that they require secondary manufacturing operations and materials which can be expensive to acquire and apply and they would be subject to damage/removal in a rough pallet handling environment.

It is known that thermoformable resins can be co-extruded to yield an engineered sheet construction with enhanced characteristics. For example, U.S. Pat. No. 5,143,778 to Shuert proposes a co-ex sheet construction to provide a more rigid pallet structure. The co-ex principle has been suggested by Gordon in U.S. Pat. No. 5,984,126 to provide an industrial container formed from a structural sheet that has an outer layer of fire resistant intumescent material to prevent the breaching and subsequent spilling of flammable lading. Although the Gordon approach may be useful in some applications, it would be difficult to implement the approach in a twin sheet pallet that would typically be under load.

Polyolefins have a notoriously low heat deflection temperature and a co-ex intumescent twin sheet pallet construction would surely collapse when softened by the heat of a fire. It is also not known what intumescent admixture Gordon proposes. Another problem being that an intumescent system must be processable by the practitioner of thermoforming methods. According to these problems, there is need for a new and useful approach to provide a fire resistant pallet that will also maintain it load bearing strength in high temperature environments.

It may also be appreciated that conventional wooden pallets are low-tech. Plastic pallets are becoming increasingly sophisticated. A hollow pallet having an internal wireless communications device that triggers a 911 emergency data signal in response to a fire or the heat of a combustion flame to a remote "emergency" monitor would be beneficial.

It is also understood that plastic pallets have been used to replace wooden pallets with some success because wooden pallets deteriorate through normal wear and tear. Examples of wooden pallet deterioration include, but are not limited to, splintered wooden boards and stringers and projecting nails. In addition to causing damage to packaging materials and automated pallet handling equipment, these examples of deterioration also cause workforce injuries as a result of manual wooden pallet handling. While plastic pallets eliminate these problems to a large extent and have been used to some advantage because they do not deteriorate in the same fashion, it may be argued that plastic pallets remain nonetheless difficult to manually handle by warehouse workers because of their heavyweight construction. Pallets in the prior art have not been developed with ergonomic principles in mind. Ergonomic pallets are needed.

It is also known that plastic pallets, which are used to support loads that may be suspended upon racks adjacent the work area of a warehouse worker, are often times constructed of plastic materials that exhibit low coefficients of friction. Two such materials with relatively low coefficients of friction include polyethylene and polypropylene. According to this potential safety problem it has been advantageous to offer such pallet materials with skid resistant properties or treatment.

U.S. Pat. No. 4,428,306 discloses a non-skid surface applied to the polyethylene sheet prior to forming the pallet structure. Alternatively, in U.S. Pat. No. 5,648,031, it has been suggested anti-slip droplets may be sprayed upon the surface of the material forming the plastic pallet to provide a skid-resistant treatment. Although these and other approaches provide some skid resistant protection they are disadvantageous in that they required additional material and or processing expense in their original manufacture and eventual recycling. Pallets with a high coefficient of friction surface on the top and the bottom are needed to prevent slippage of the load carried by the pallet, and slippage of the pallet on the support surface.

It is also known that plastic pallets must interface within distribution networks where it is common to unitize a pallet load with shrink-wrap and other banding materials. Plastic pallets have not been adequately developed to interface with these and other packaging methods. In U.S. Pat. No. 5,676,064 to Shuert, a downward extending peripheral lip and indents in the outer leg structures are suggested to accommodate packaging materials.

U.S. Pat. No. 5,408,937 to Knight et al. discloses indented surfaces upon the legs are suggested to receive wrapping materials. Although these arrangements are helpful, they do not allow the warehouse worker to manually and ergonomically initiate the starting stretch and cling of widely used packaging films around the pallet for final unitization. A pallet amenable to unitization is needed.

As above discussed, it is well known in the art that plastic pallets and particularly thermoformed plastic pallets have many advantages over wooden pallets. The disadvantage of initial price, however, is increasingly a more complex justification for selecting wooden pallets when compared to plastic pallets. Although twin sheet plastic pallets have been employed successfully to replace wood, breakthroughs in the cost equation and the value-added execution of thermoformed plastic pallets are finally needed to justify a wholesale conversion from wooden pallets to plastic pallets.

SUMMARY OF THE INVENTION

In accordance with the present invention there is provide a fire resistant pallet that includes a pallet assembly. A fires resistant layer is formed upon an exterior of the pallet assembly.

Further in accordance with the present invention there is provided a fire resistant pallet that includes at least a first layer of moldable intumescent material. A second layer of moldable polyolefin material is also provided. The first and second layers are co-extruded together prior to be molded into the fire resistant pallet.

Further in accordance with the present invention there is provided a fire resistant pallet that includes a moldable mixture of intumescent materials that includes polyethylene resin.

In addition, the present invention is directed to a fire resistant pallet that includes a pallet assembly having a molded polyolefin interior structure for supporting a load thereon. An outer layer surrounds the molded polyolefin interior structure forming an exterior surface. The exterior surface includes fire resistant material having superior fire resistance relative to the molded polyolefin interior structure.

Additionally, the present invention is directed to a fire resistant pallet that includes a pallet assembly having at least one pallet member with an external surface. The one pallet member has an inner layer with moldable polyolefin material and an other layer with a mixture of moldable polyolefin material and intumescent material forming a fire resistant exterior surface thereon.

Further in accordance with the present invention there is provided a pallet assembly that includes at least one pallet member having external surfaces. A flame retardant material is affixed to the one pallet member so as to substantially cover all of the external surfaces of the pallet member. The flame retardant material is composed of a composite including polyethylene and intumescent materials.

In accordance with the present invention there is also provided a pallet assembly that includes at least one pallet member having external surfaces. A flame retardant material is affixed to the one pallet member so as to substantially cover all of the external surfaces of the pallet member. The flame retardant material is composed of a composite material including a polymer material integrated with one of more water-vapor generated intumescent materials. The intumescent materials comprise between about 0.0% and 25% weight of the composite.

Further in accordance with the present invention there is provided a method of fire retarding a pallet assembly that includes the steps of providing a pallet assembly including at least one pallet member having external surfaces. A flame retardant liquid including an intumescent material is affixed to the one pallet member so as to substantially cover all of the external surfaces of the pallet member. The flame retardant is liquefied for melt processing by extrusion over a sheet precursor of the pallet material.

In addition, the present invention is directed to a pallet assembly that includes at least one pallet member having external surfaces. A flame retardant material is affixed to at least one pallet member so as to substantially cover all of the external surfaces of the pallet member. The flame retardant material includes a flame retardant liquid comprising an intumescent material. The pallet member is molded from a sheet of plastic made of a first liquid melt stream containing fire retardants including intumescent materials and a second liquid melt stream substantially excluding fire retardant materials. The second liquid melt stream is 2 to 6 times thicker than the first liquid melt stream.

Additionally, the present invention is directed to a twin sheet pallet assembly that includes a first co-extruded thermoplastic sheet heated to a heat deformable temperature and molded against a first tooling surface to form a load support component having first exterior and interior surfaces and a second co-extruded thermoplastic sheet heated to a heat deformable temperature and molded against a second tooling surface to form a structural component having a second and external surfaces. The first and second co-extruded thermoplastic sheets each include a first layer of polyethylene integrated with a predetermined amount of moldable intumescent compositions providing a degree of fire resistance to comply with industry standards and a second layer of polyethylene that is not integrated with the predetermined amount of moldable intumescent composition. The second layers of polyethylene are thicker in cross-section than the first layers. The first layers of polyethylene are positioned against the tooling surfaces during molding to form the exterior surfaces so that upon exposure to a high heat indicative of a fire a predetermined amount of intumescent materials prevent the interior surfaces in the second layers from exceeding the industry standards for commodity and idle pallet storage.

Accordingly, a principal object of the present invention is to provide a plastic pallet that is no more or less a fire hazard than wooded pallets.

Another object of the present invention is to provide a plastic pallet having a load-bearing strength comparable to wooden pallet and molded of thermoformed sheet having fire resistant properties that exceed the fire resistant properties of wooded pallets.

An additional object of the present invention is to provide a plastic pallet having an intumescent polymeric material co-extruded onto a polyethylene or polypropylene substrate forming a thermoformed plastic pallet.

Another object of the present invention is to provide a plastic pallet with fire resistance by the addition of intumescent polymeric material to the plastic pallet.

An additional object to the present invention is to provide a plastic pallet with an intumescent system having excellent thermoinsulating properties to protect the internal structure of a plastic pallet against heat that is generated by the high temperature of a combustion flame.

These and other objects of the present will be more completely disclosed and described in the following specification, accompanying drawings, and appended claims.

BRIEF DESCRIPTION OF THE DRAWINGS

FIG. 3 is a fragmentary isometric view of the bottom first sheet common to both the pallet members illustrated in FIGS. 1 and 2.

FIG. 4 is a fragmentary isometric view of the middle second sheet of the pallet member illustrated in FIG. 1.

FIG. 5 is a fragmentary isometric view of the top third sheet of the pallet member illustrated in FIG. 1.

FIG. 10 is an isometric view of the combination of the nine-legged pallet shown as FIG. 2 and the load distributor shown in FIG. 6.

FIG. 11 is a fragmentary sectional view in side elevation of the combination of an intumescent composition sheet and an interior structural member of the fire retardant pallet.

FIG. 14 is a fragmentary sectional view in side elevation of apparatus forming the projection of the snap together feature associated with load distributor.

FIG. 15 is a fragmentary sectional view in side elevation of the apparatus forming the recess of the snap together feature associated with either the nesting or nine-legged pallet members shown in FIGS. 1 and 2.

FIG. 18 is a fragmentary sectional view in side elevation of the apparatus showing a space defined by dashed lines between the outside margin and the bottom of the pallet.

DESCRIPTION OF THE PREFERRED EMBODIMENTS

Figure 1:
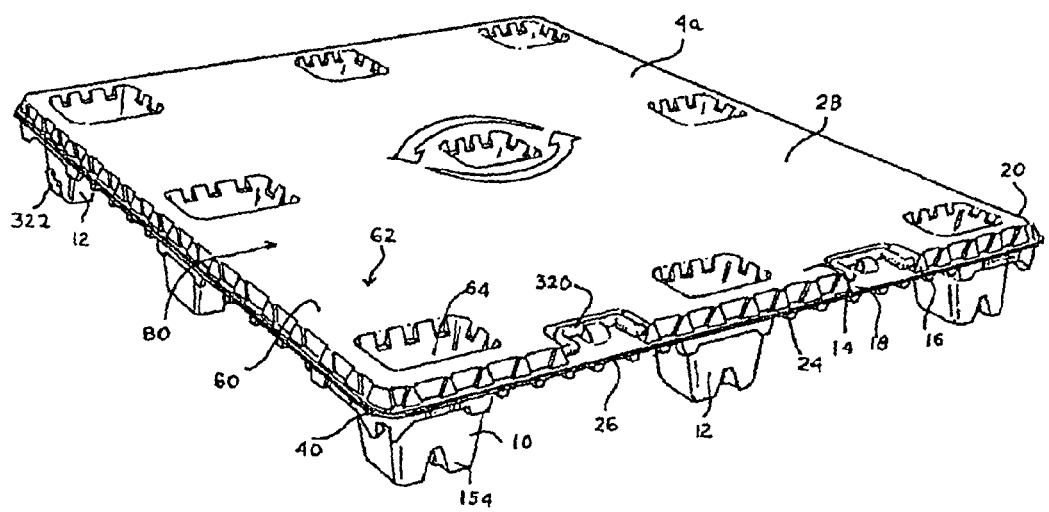
FIG. 1 is an isometric view of a nestable pallet having nine leg pockets.

U.S. Pat. No. 6,294,114 in the name of the present inventor discloses triple sheet thermoforming apparatus, methods and articles and is incorporated herein by reference. As disclosed in the above patent, three sheets of plastic are sequentially thermoformed in a single manufacturing process to provide a unitary article, such as a pallet, having a hybrid honeycomb type structure. The present inventor has reduced triple sheet load bearing platforms to practice and has compared the same to several corresponding bench mark twin sheet load bearing platforms in a controlled test environment administered by an independent third party. Triple sheet platforms have a demonstrably superior level of load bearing strength than twin sheet platforms having substantially the equivalent weight or volume of plastic material. Accordingly, three relatively thinner sheets comprising a much lower volume of plastic can be utilized in a triple sheet method to provide a given requirement of load bearing strength offered by a twin sheet method. A triple sheet pallet construction is therefore preferred over a twin sheet pallet construction.

One purpose for thermoforming three sheets of plastic and sequentially fusing them together under progressive compressive forces is to provide a unitary structure that develops more strength than can be achieved in a twin sheet construction. Substantial interfacial adhesion throughout the body of a triple sheet structure is therefore desirable to provide a strong article. A comparably stronger triple sheet article can therefore be reduced in weight to provide the same measure of strength as a twin sheet article for economic advantage.

Two sheets of alike plastic material achieve interfacial adhesion when the alike plastic material reaches a hot tack or melting temperature and are compressed together. In the thermoforming methodology, compression may be facilitated by either mechanical compression or by differential atmospheric pressure as in applied vacuum. It is known that thinner plastic sheets displace temperature faster than comparatively thicker sheet of equivalent plastic. Thus, it is advantageous to increase the surface area of the thinner plastic sheet to provide enhanced hot tack adhesion characteristics. Scuffing the surface(s) of the relatively thin gauge of sheet to increase the molecular surface area and subsequent bond strength of the deformable plastic sheet is offered as an improvement over the prior art. The present improvement of scuffing sheet to improve the bond strength between the sheets of plastic make possible the use of relatively thinner sheet of plastic material and thus enables implementation of an object of the present invention.

In practicing the methods of triple sheet thermoforming, in which case it may be preferable to use a lower measure of plastic, relatively thinner sheets of plastic are therefore utilized to advantage. This preference exists in the case of plastic pallets because plastic pallets are more expensive than comparable wooden pallets. In a preferred method, three sheets of heat deformable plastic are sequentially molded and selectively fused together by means of hot tack adhesion and compressive forces. In triple sheet methods, the first sheet is formed upon a lower platen mold and the second and third sheets are successively formed on second and third molds on an upper platen. The effect of hot tack adhesion is not achieved when alike plastics fall below a given temperature threshold. When thinner sheets of heat deformable sheet are used, heat dissipation is accelerated, and satisfactory hot tack adhesion may not result in the selected bonding locations, even under compression. According to this potential problem, the three sheets are developed to provide increased surface area to promote hot tack adhesion in selected areas where the sheets are required to fuse together. Increased surface area allows the practitioner of the triple sheet thermoforming method to utilize relatively thinner sheet of heat deformable plastic material.

It is customary to extrude thermoformable plastic through rollers imparting a substantially smooth surface in the twin sheet thermoforming art. Smooth surfaces have comparably low surface areas. (The exposed surfaces of twin sheet thermoformed articles are typically provided with texture by a textured tooling surface.) In the twin sheet art, it is not always necessary to have surfaces with high energy. This may not be the case in the triple sheet art. In other market places, plastic scuffing is used advantageously for a variety of purposes. Two notable examples of scuffing, in which no other materials are introduced, are suggested in the prior art. A first example includes FrictionFlex® Textured HDPE sold by GSE Lining Technology of Houston, Tex. In this application, scuffing of the sheet is provided to enable steep tractor ascents over thermoplastic (industrial, garbage and pond) liners.

The FrictionFlex® method may be comprehended by referring to U.S. Pat. No. 5,728,424. In a second example, skid resistant bed liners for pick up trucks, which are constructed of low cost polyethylene, are also known to have a preferred high coefficient of friction to prevent the slippage of cargo contained thereon. As disclosed in U.S. Pat. No. 6,095,787 heavy-duty brushes are counter rotated over the surface of the sheet during the extrusion phase to provide a surface having a high area or surface energy. These low cost scuffing methodologies are incorporated by reference herein to provide a high area, high energy surface(s) amenable for practicing the art of triple sheet thermoforming with relatively thin sheets of plastic.

In the present example, three successive sheets of heat deformable material are delivered to the thermoforming apparatus. The top surfaces of the three plastic sheets in the present embodiment are scuffed in a manner suggested, particularly in accordance with the method of U.S. Pat. No. 6,095,787. Consequently, according to one of the possible sequences of the triple sheet methodology, the first sheet is molded into a female mold supported upon the lower platen. In this arrangement, the scuffed top surface of the first sheet molded is exposed for compression against the un-scuffed surface of the second sheet to be thermoformed. When the first sheet and the second sheet, which has been separately formed on a second mold associated with an upper platen, are brought together under compression by the relative movement of the platens the scuffed first sheet more effectively bonds to the corresponding un-scuffed surface of the second sheet.

When the second sheet is released from the clamp frames, and allowed to descend with the first sheet as a twin sheet sub-assembly into a lower platen extract position, a third mold associated with the upper platen deforms a third sheet. The lower un-scuffed surface of the third sheet is subsequently compressed against the scuffed surface of the second sheet by vertical movement of the lower platen in timed sequence. In this arrangement, the second scuffed sheet surface is able to achieve a higher degree of hot tack adhesion with improved bond strength to the third sheet than would be the case if the second plastic sheet had a substantially smooth finish with comparably lower surface area and energy. Thus, it may be appreciated that if the second sheet temperature falls below the hot tack or melting temperature during the third sheet forming operation, the increased surface area of the second sheet will absorb heat from the third sheet when these are brought together. The absorbed heat will yield a higher strength bond when the two members are brought into contact under compressive force.

Deformable scuffed sheet allows the practitioner to advantageously use thinner sheet to meet objectives of the present invention. In the present thermoforming sequence, the top surface of the third plastic sheet is scuffed and therefore provided with a high coefficient of friction surface for a secondary skid resistant advantage. As in the present case, this is preferable, because the scuffed surface of the third sheet helps to support the load upon the pallet. As in the case of the pallet embodiments of FIGS. 1 and 2, this sequence of sheet use produces a skid resistant pallet deck.

Another advantage of this method is that a single source of common sheet may be employed in the present application of triple sheet thermoforming for more than one advantage. It should also be noted that both surfaces of the sheet may be scuffed during the extrusion phase, or a plurality of sheet materials may be offered with predetermined scuffed and un-scuffed combinations, depending upon the preferences of the triple sheet practitioner. It should also be noted that the present arrangement for scuffing sheet might also be applied advantageously to twin sheet applications where interfacial bond strength is inadequate for the article's intended purpose.

It should be further noted that scuffing could be utilized in thermoforming operations that produce articles other than industrial platforms including pallets. Other such articles include, but are certainly not limited to the following: gas tanks for vehicles, boat hulls, industrial containers, dumpster lids, wall and door panels, exterior automotive and aerospace bodies, recreational and sporting goods, lawn and garden products, home appliances, and any other primary end market categories in which thermoformed articles are provided.

Accordingly, as illustrated to advantage in FIGS. 3, 4 and 5, which show a single quadrant of a four quadrant pallet member, the three sheets 2a, 2b and 2c forming a load supporting platform 4 are scuffed during the extrusion phase in accordance with U.S. Pat. No. 6,095,787 to provide a high surface area finish 6. The opposite sides of sheets 2 are provided with a substantially smooth surface 8, but may also be scuffed as preferred by the triple sheet practitioner. As may be appreciated by quickly referring to FIGS. 1 and 2, load-supporting platforms 4a and 4b are comprised of three sheets of heat deformable plastic material 2a, 2b and 2c. The platforms 4 are attached to a load distributing base 90, which itself comprises three sheets 3a, 3b and 3c. Therefore, the racking pallet of FIG. 10 is preferably comprised of six sheets of molded plastic.

In FIG. 3, the first sheet 2a thermoformed in the triple sheet thermoforming sequence is the bottom member 10. The bottom member 10 includes a plurality of legs 12 that support the pallet's underlying deck 14 a predetermined distance above the floor or pallet platform. The bottom member 10 also includes a perimeter margin 16 comprising sidewall regions 18 and corner regions 20. The perimeter margin 16 also includes boarders 24, which boarders define the terminating edge 26 of the bottom member 10. Within a deck region 28 extending between the legs 12 and the side wall and corner regions 18 and 20, are a plurality of molded in details 30 that extend upwards from a substantially flat base 32. Details 30 may also depend downward from the base 32. Portions 34 (suggested in broken line detail in FIG. 4) of the upper scuffed surfaces 36 of the details 30 and perimeter margin 16 of sheet 2a are developed to achieve interfacial contact and hot tack adhesion with the underside un-scuffed surfaces 42 of sheet 2b. Thus, it may be appreciated that the bottom member 10 achieves interfacial contact with the center member 40 throughout several locations in a complex reinforcing manner to produce a twin sheet subassembly.

Now referring to FIG. 4, the center member 40 of a present embodiment is shown. The center member 40 is derived from sheet 2b and is the second member to be thermoformed in the triple sheet methodology. The top surface 38 of sheet 2b is scuffed according to the referred manner. Center member 40 comprises planer surface 44 with a plurality of upward extending details 46 supporting the top member 60, and a plurality of downward extending details 48 reinforcing the bottom member 10. Portions 50 (suggested in broken line detail in FIG. 5) of the underside 42 of surface 44 and portions of the downward extending details 48 of member 40 are developed to contact and bond to the upper surfaces 34 of the bottom member 10. Accordingly, it may be appreciated that when the two members 10 and 40 are brought together under compression in the triple sheet method, interfacial hot tack adhesion occurs there between in a complex arrangement in a plurality of locations to provide a selectively fused together unitary twin sheet substructure.

As further suggested in reference to FIG. 4, the center member 40 comprises a number of other reinforcing details. These details include, but are not limited to leg elements 51, reinforcing steps 52, stiffening cross members 54, laterally arranged channels 56, projection posts 57 and perimeter boarder projections 58, which projections 58 are arranged to deflect side wall impacts from fork lift tines and the like.

Now referring to FIG. 5, the top member 60 of a present embodiment is offered. The top member 60 is derived from sheet 2c, and is the third member to be thermoformed according to the triple sheet method. The top member 60 comprises a substantially flat scuffed exterior surface 62 extending between the depending leg pockets 64 and the downward extending peripheral margin 66 defining an edge 68 of the top member 60. As may be appreciated by referring to broken lines 70, the top scuffed surfaces 38 of member 40 achieve interfacial contact with un-scuffed underside surfaces of member 60 when the two members are brought together under compression in the triple sheet method. According to this arrangement, a unitary pallet construction comprised of three selectively fused together sheets 2a, 2b and 2c of plastic results yielding a pallet 4a with a complex geometry of rigidifying elements providing break through load bearing strength.

The present embodiment represented in FIGS. 3, 4 and 5 in combination produce an article referred to as nesting or nine-legged pallet 80 which is illustrated to advantage in FIG. 1. The present embodiment illustrates to advantage the ability of the triple sheet method to mold a more complex structure engineered to support relatively more load bearing weight than a comparable twin sheet structure of an equivalent amount of relatively expensive plastic material. The center member 40 provides a honeycomb type structure imparting significant increases in load bearing strength.

Reducing the amount of plastic used to make the triple sheet structure gains efficiency and competitive advantage within a market now dominated by less expensive wooden pallets. In the preferred improved methods, sheets of plastic are scuffed in accordance with the described method to increase hot tack adhesion under compression in order to optimize the use of thinner gauge sheet for the lowest material weight structure.

Figure 2:
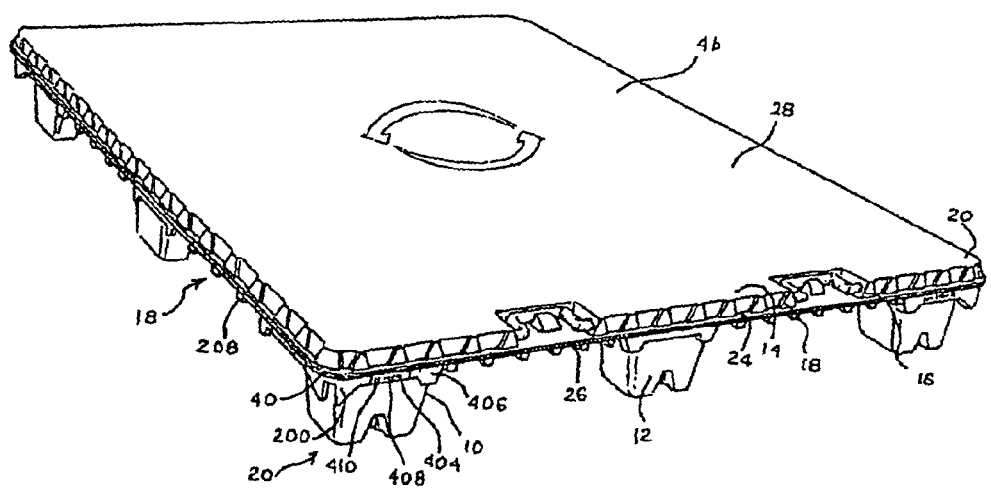
FIG. 2 is an isometric view of a nine-legged pallet having an uninterrupted load-supporting surface.
Figure 6:
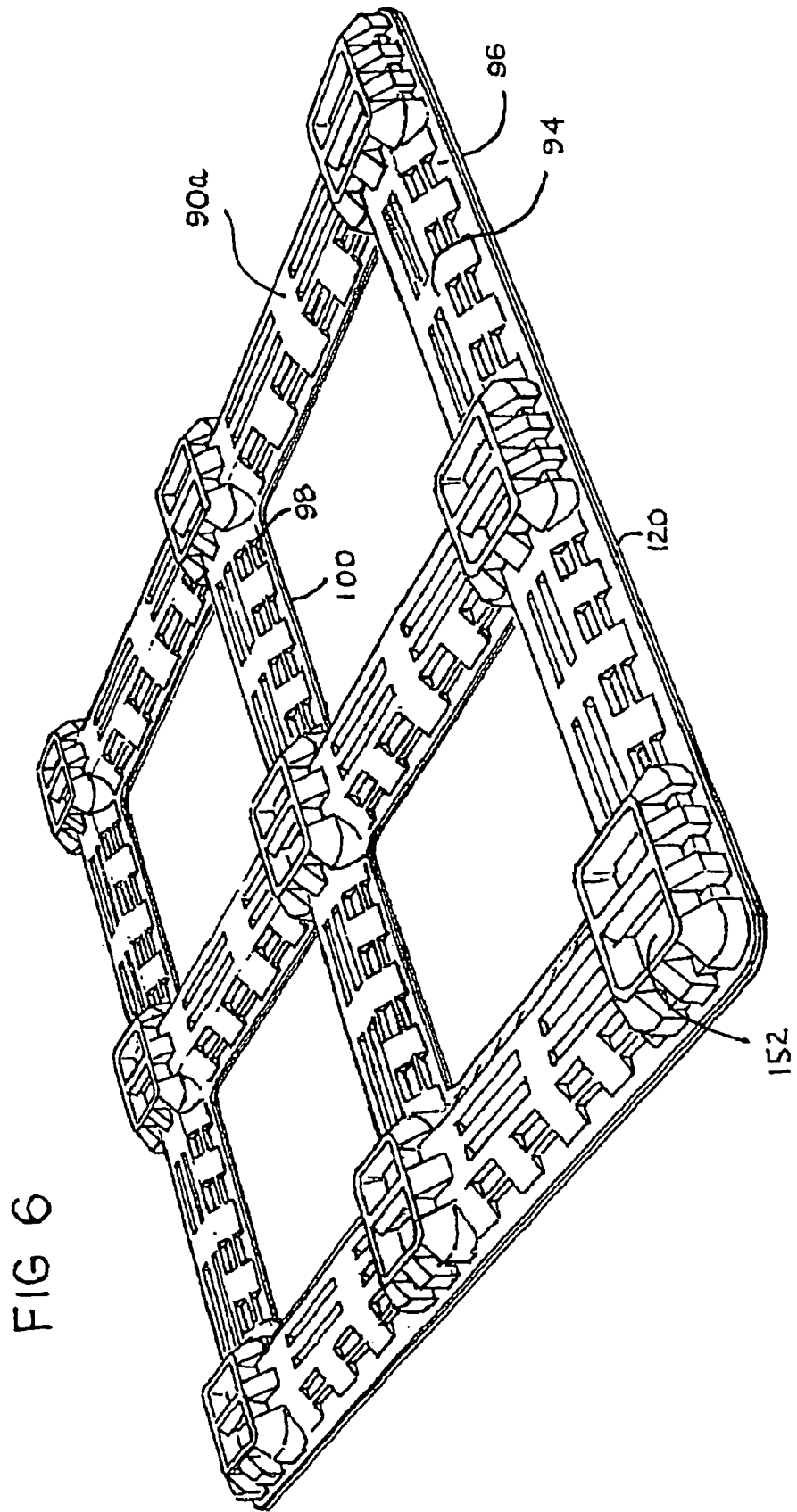
FIG. 6 is an isometric view of a load distributor, illustrating four cutouts for receipt of the wheels of a pallet jack.
Figure 8:
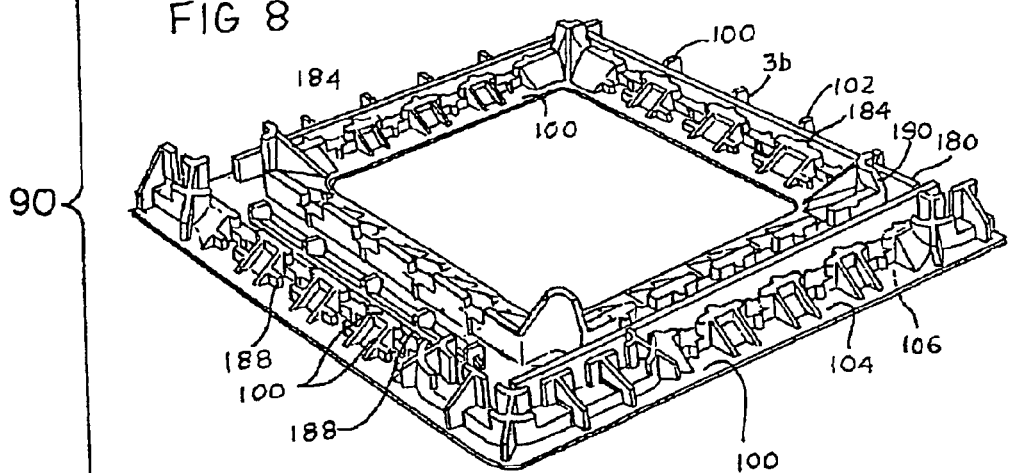
FIG. 8 is a fragmentary isometric view of the middle second sheet of the load distributor shown in FIG. 6, illustrating the structural molding for optionally receiving reinforcing inserts.
Figure 9:
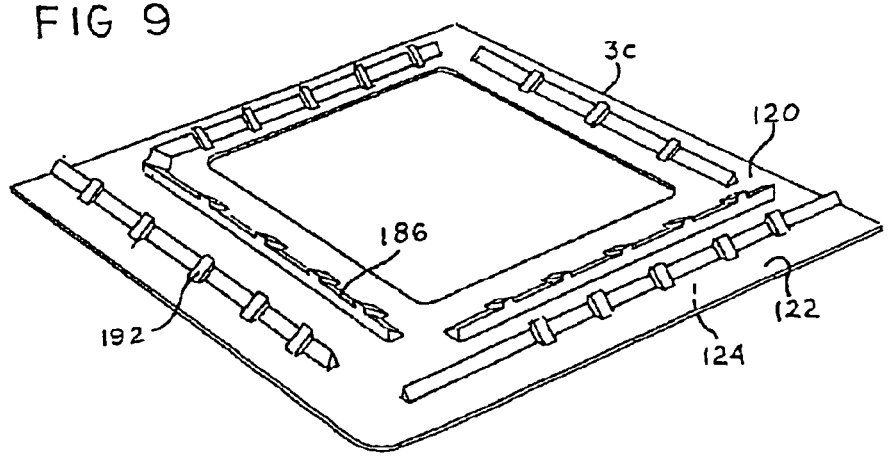
FIG. 9 is a fragmentary isometric view of the bottom third sheet of the load distributor shown in FIG. 6, illustrating a scuffed underside surface for increased skid-resistance.

It may also be appreciated that the improved strength associated with the pallet 80 embodiment represented in FIG. 1 may be applied to other pallet embodiments, including that shown in FIG. 2, which is a nine legged pallet platform 4b. By way of further example, the load distributor 90 of FIG. 6, which is portrayed in the combination of FIGS. 7, 8 and 9, is also constructed of sheet scuffed for improved bond strength.

Figure 7:
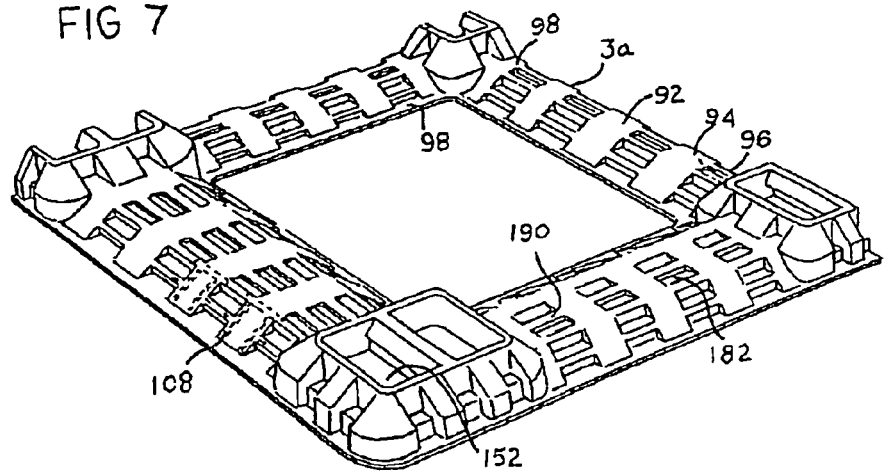
FIG. 7 is a fragmentary isometric view of the top first sheet of the load distributor shown in FIG. 6, illustrating the location of reinforcing inserts for increased load bearing strength.

In the present sequence of the triple sheet methodology used to thermoform load distributor 90, the first sheet 3a of FIG. 7 is deformed against a first mold positioned upon the lower platen. The top surface 94 of sheet 3a is un-scuffed, while the underside surface 96 is scuffed. The underside surface 96 includes a plurality of locations 98 where the first sheet 3a achieves hot tack adhesion with corresponding locations 100 of sheet 3b when these are brought together under compression.

Sheet 3b is the center member 102 of load distributor 90. Center member 102 has a scuffed undersurface 106 and an un-scuffed upper surface 104. Surfaces 96 and 104 are developed to fuse in pre-selected locations 98, which are suggested for illustration by broken lines 108 seen in FIG. 7. The scuffed under surface 106 of the center member 102 is developed to fuse to the un-scuffed surface 122 of sheet 3c forming the base member 120 of load distributor 90.

Accordingly, it may be appreciated that after sheet 3c is deformed over a third mold, the scuffed surface 106 of sheet 3b is fused to sheet 3a, which remains in communication with the first mold. The first mold is sequentially compressed against the third mold, so that the un-scuffed surface 122 of the base member 120 achieves hot tack adhesion with the scuffed surface 106 of the center member 102. This arrangement provides a unitary triple sheet structure known as a load distributor 90, with a scuffed underside surface 124 having a relatively high co-efficient of friction. The skid resistant bottom surface 124 of load distributor 90 is preferred so that load distributor 90 will not unnecessarily move or dislodge during its intended use.

Accordingly, the present embodiment of a load distributor 90 can be constructed out of three sheets of plastic that in combination weigh less than the combination of twin sheets used to produce a comparable load distributor with the same load distributing strength. A comparable twin sheet load distributor may be known by referring to U.S. Pat. Nos. 5,638,760 and 5,758,855, both to Jordan et al. In the present preferred embodiment, three relatively thinner sheets are scuffed to encourage increased hot tack adhesion and a more robust pallet construction.

Referring now in detail to FIG. 10, it is suggested that load supporting platform 4b and load distributing base 90 can be combined to provide a rackable pallet 150b. As can be seen, pockets 152 associated with the distributor 90 receive legs 12 of platform 4b. As is also suggested, either of the platforms 4a or 4b and distributor 90 can be advantageously combined to provide a unitary pallet in the manner suggested by illustration.

Figure 12:
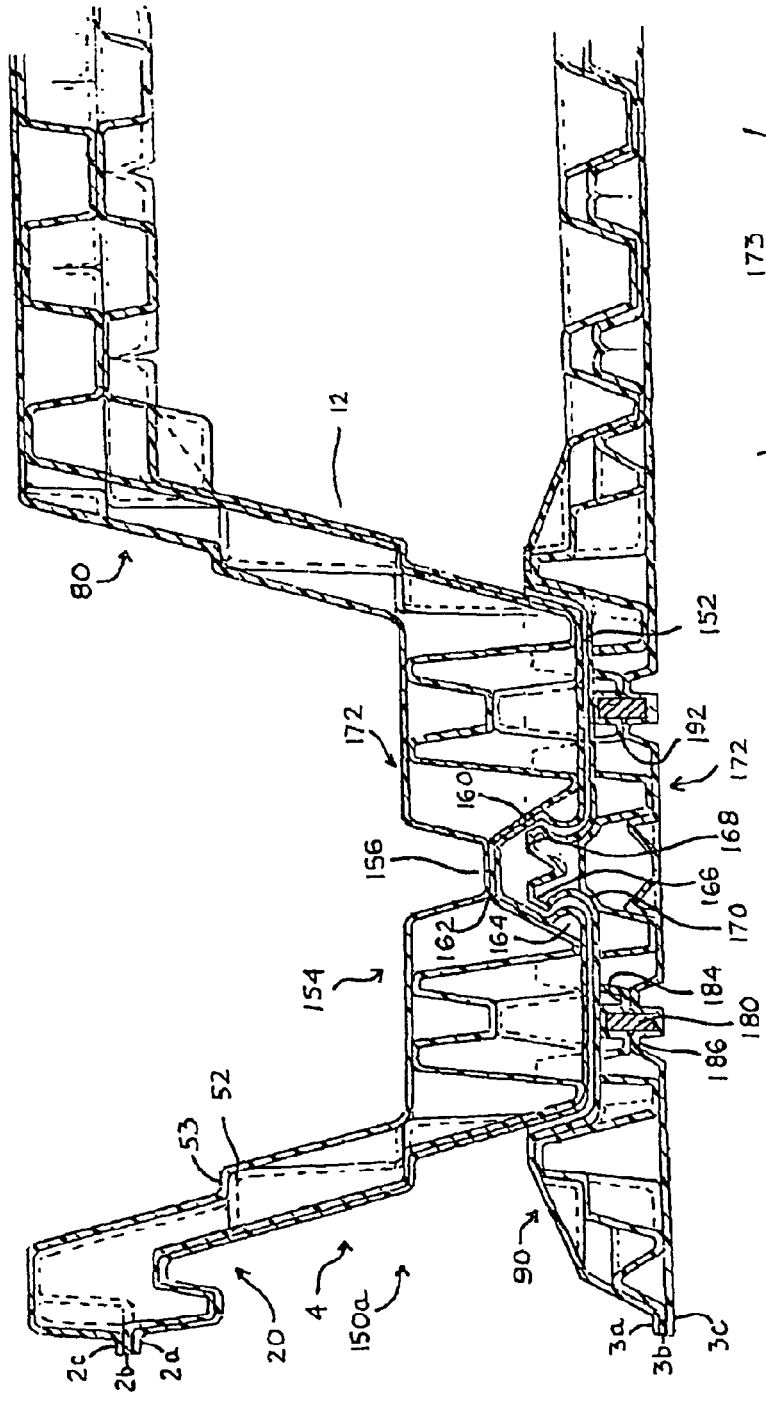
FIG. 12 is a fragmentary sectional view in side elevation of the pallet center perimeter leg taken along line XII-XII of FIG. 10, illustrating a snap together feature.

In present embodiments, which may best be understood by now referring to FIG. 12, rigid legs 12 are constructed out of sheets 2a, 2b, and 2c. In the proximate location of the leg bottom 154, the sheets 2a, 2b, and 2c come together under compression to provide a location for a leg drain hole 156. In the location of leg bottom 154 of pallet 150a, the sheet 2a is developed to engage sheet 3a, which is developed to engage sheet 2a. Sheet 2a comprises opposed vertical walls 160 and flat surface 162 in the leg bottom 154. Along walls 160 are projections 164, which result from (mechanical) tooling developed to thermoform undercut details. Sheet 3a comprises vertical walls 166 and flat surfaces 168 within a recess 170 formed by a pocket 152 receiving the leg 12 of sheet 2a. Along vertical walls 166 are recesses 170, which result from (mechanical) tooling developed to thermoform undercut details. The recesses 170 receive the projections 164, when a platform 4 and distributor 90 are compressed together in an overlaying relationship. Although the preferred arrangement is a triple sheet construction for the advantage of strength, the formation of projections and recessions can be adapted for twin sheet thermoforming purposes. As also is preferred, sheets 2b and 3b are developed to reinforce the regions 172 around the projections 164 and recesses 170.

Figure 13:
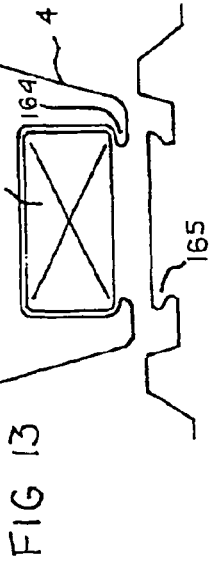
FIG. 13 is a schematic illustration of an alternative embodiment of the snap together feature, illustrating an insert member, such as a segment of a wooden 2×4, for a reinforced pallet arrangement.
Figure 16:
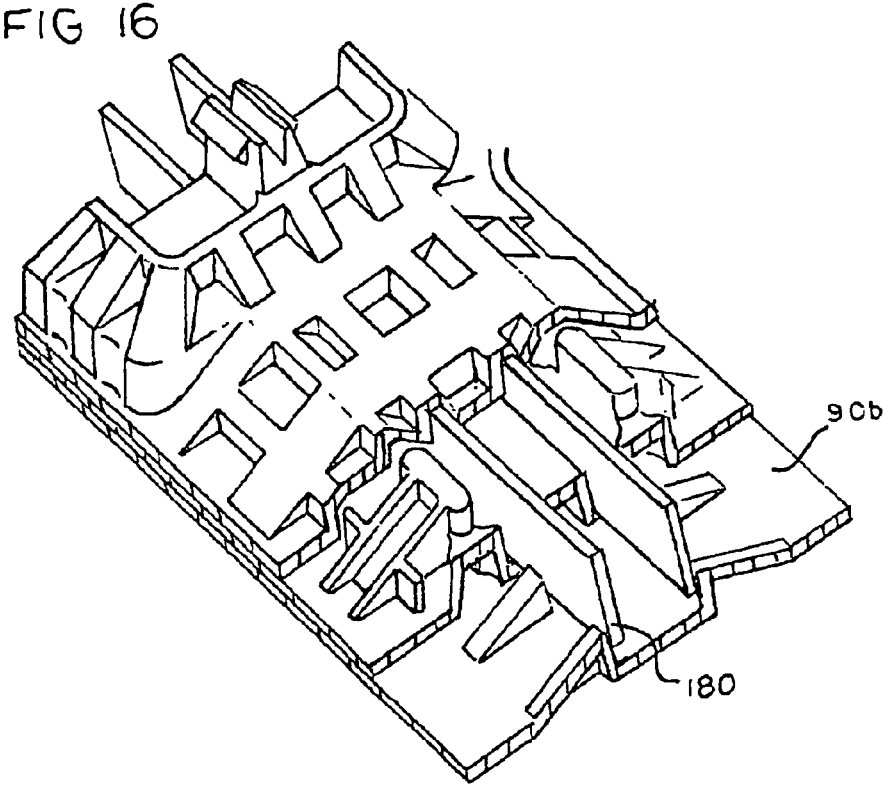
FIG. 16 is a fragmentary isometric partial sectional view of the load distributor, illustrating rigidifying inserts placed between the first and second sheets for increasing load bearing strength.

As seen in FIG. 13, projections 164 may be adapted to receive cross members 172, such as for example a wooden 2×4, or the corresponding triple sheet pallet member recesses 165 as suggested, depending upon the preferred use of platform 4.

A further explanation of the formation of the projections and recessions in the respective members is suggested in FIGS. 14 and 15. In FIG. 14, the application surface 130 of first mold 132 receives a machined cut 134. The machined cut is adapted to receive mechanical "under cut" thermoforming apparatus 136. The apparatus is for the projections 164 and includes actuated elements 166 responding to process control instructions of the thermoforming machine programmable logic controller. In FIG. 15, the corresponding apparatus for thermoforming the recess is suggested.

The advantage of utilizing common mechanical apparatus for each projection and recess interface is that the mechanical apparatus can be duplicated for all thermoforming molds in the product line category. Accordingly, bottom members 10 may be used for both nine leg platform 4b and inter-nesting platform 4a applications and in association with a smaller number of load distributors 90 for racking and other unit load platforms 150. The pool of members 4a and 4b and 90 can be selectively reconfigured using the snap-fit feature to meet variable demand throughout the distribution system.

Referring now to the nationwide distribution system associated with the use of a standard 40 inch by 48 inch wooden stringer pallet, it has been determined by associations of wooden pallet end users that approximately 30% of all unit loads are less than 1000 pounds, and that 66% weight less than 2000 pounds. The remaining unit loads, representing approximately 14%, weight today's 2800-pound wooden pallet specification. Accordingly, it is suggested that the triple sheet members presently embodied in FIGS. 1, 2 and 6 interface in combinations of construction that are adapted meet the three unit load threshold requirements of industry with at least the three platform configurations represented in FIGS. 1, 2 and 10.

Accordingly, the platform 4 is offered in three styles 4a, 4b, and 4c. The first style of member 4a is suggested in FIG. 1 and includes a load-supporting surface interrupted by a plurality of leg pockets for consolidated storage and shipping. The second style is member 4b of FIG. 2, and is provided with an uninterrupted surface. The third style 4c is a derivative of style 4b and includes reinforcing elements 180 for additional load supporting strength. The style 4c is not shown.

Furthermore, the distributor 90 is offered in two styles. The first style 90a is illustrated in FIGS. 7, 8 and 9. The second style 90b includes the addition of reinforcing members 180. The second style 90b is the 90a style without the reinforcement members. (Both styles are suggested in FIG. 8.)

The three models suggested above can produce a product line of 9 part numbers or combinations. Several combinations are suggested for a range of pallet criteria described above. Accordingly, the interoperability of members 4a, 4b, 4c, 90a, and 90b is a desirable characteristic from the standpoint of resource allocation and asset management practices. It is also preferred that the inventions and improvements suggested by the present applicant's U.S. patent application Ser. No. 60/177,383, entitled "Thermoformed plastic pallet with RF devices", be adapted to the present inventions where desirable to improve the over-all efficiency of the present pallet members within the North American distribution system.

Referring back to FIGS. 7 and 8, reinforcing members 180 are suggested. In particular, it can be seen that elements 182 of sheet 3a extend downward to engage the reinforcing members 180, and elements 184 of sheet 3b extend upward to engage the reinforcing members 180. Elements 186 of sheet 3c may also extend upward to reinforce the elements 184 of sheet 3b engaging the reinforcing members 180. The arrangement produces a stiffer member 90b than the non-reinforced member 90a. The member 90a formed without the reinforcing elements 180 is nonetheless stronger than an equivalent twin sheet plastic member utilizing the same measure of plastic is as the triple sheet member 90a. When the reinforcing elements 180 are excluded from the construction, the elements 182, 184 and 186 otherwise engaging said members 180 are encouraged to selectively web 188 in preferred locations, to deform for strength advantage in areas 190, or to fuse to corresponding surfaces 192 of an associated sheet 3a, b, or c.

It may be appreciated that the present objective of utilizing one mold group to produce successively more rigid triple sheet members may be applied to a range of suitably developed load bearing platforms. Accordingly, reinforcing members 180 may be inserted within the structure of a load-supporting platform 4c as well as a load-distributing base 90. (It should be noted that the embodiment represented in FIGS. 3, 4 and 5 do not contemplate the dual modes of construction contemplated in the single set of molds associated with FIGS. 7, 8 and 9, because the disclosure, of FIGS. 3, 4 and 5 proposes a nesting nine legged pallet in which case the pockets would interfere with elongated members 180.) Furthermore, depending upon the preference of the practitioner, it may be desirable to develop the members forming the triple sheet structures to receive reinforcing elements between the first and second sheet, or/and between the second and third sheets of the triple sheet construction.

Referring again to the distribution system, it is known that the pallets within warehouse environments from time to time become involved in fires. The present plastic pallet embodiments may therefore be adapted in the preferred manner described below to provide a level of protection against fire that is equal to or greater than wooden pallets. Normally, polyolefins such as polyethylene and polypropylene upon exposure to a combustion flame quickly melt and ignite to sustain combustion and to drip a burning liquid spreading the flame. In the present embodiments of thermoformed pallets in which case three sheets are used, the two outer sheets alone are provided with intumescent properties, which properties are imparted upon the outer exposed surfaces of the sheets by means of a co-extrusion process. When exposed to flames the intumescent additives in the co-extruded cap stock 300 react or decompose to convert the cap stock into a residual insulating foam-like structure that is resistant to burning. In this manner, an intumescent sheet construction prevents the polyolefin from rapidly melting and dripping burning liquids.

The intumescent polyolifen composition 302 that is preferred and can be used for the present application is in accordance with U.S. Pat. No. 5,834,535 to Abu-Is a et al. which, issued Nov. 10, 1998 and is incorporated herein in its entirety by such reference. Among the advantages of the cited intumescent polyolefin composition is that this material is particularly suitable for thermoforming applications and is amenable to deep draw ratios of 400 percent, which is a critical aspect for forming the leg pockets of the nine-legged pallets of the present embodiments.

In addition to providing the advantage of a comparably low cost pallet construction, in which only the exposed surfaces 304 of a pallet is composed of said intumescent compositions, the arrangement provides another benefit that is particular to triple sheet pallet members. Polyolefins 306 have a comparably low temperature softening point and when this threshold is reach the polyolefin structure quickly softens and looses its structural strengths. Therefore, even though a twin sheet pallet provided with an intumescent barrier in accordance with the cited reference may resist dripping flaming liquids, the backside of the sheet may still be subjected to high temperature, which may cause the molded structure to soften and collapse. In this event, articles stored upon the collapsing pallet will spill off the pallet, which could create additional damage or injury to workers. According to this problem, the two exterior surfaces of the plastic sheets forming the present pallet embodiments of 4 and 90 are provided with intumescent properties in accordance with cited reference because the cited reference is known to have comparably superior thermal insulating properties.

The intumescent efficiency of the surfaces of the pallet will provide a thermal insulation that in cooperation with the hollow areas of air space 308 within the triple sheet pallet construction will help preserve the integrity of the interior structural member 310 of the pallet. In this manner, the triple sheet pallet will be better able to support its load under high heat, which would decrease property damage and limit potential worker injury. The present arrangement of a triple sheet pallet constructed out of three sheets, wherein the exposed surfaces 304 of the outer sheets have intumescent cap stocks 300, is disclosed in FIG. 11. It may also be appreciated that inside structural sheet 310 may be composed of polyolefins having agents and fillers that sustain the stiffness of the plastic structure in elevated temperature conditions.

The intumescent cap stock 300 of the sheets forming the triple sheet article may also be scuffed according to the principles described above for either the purpose of providing improved hot tack adhesion and bond strength or for providing a surface with a high coefficient of friction for skid resistance.

Plastic pallets having communication capabilities have also been proposed. These communications capabilities can be adapted to respond to fire or the high heat of combustion flames. In one such embodiment, as suggested in FIG. 3, a pallet contains an internal wireless communications device 400, such as a simple wireless cellular receiver transmitter. The device 400 interfaces with a thermographic instrument comprising circuitry 402 connected to a thermoscopic probe 404 exteriorly positioned upon an exposed surface 406 of the platform, as in FIG. 2. When the thermographic circuitry 402 records a variation in temperature indicative of a fire through the probe 404 the device 400 is triggered to transmit an emergency 911 signal to a remote monitoring responding station.

As suggested in the inventor's co-pending application referenced above, the signal transmission may include data packets specifying location, time, heat, load sustained, customer, packing list, manifest, maintenance, and intumescent pallet performance specifications. In even more sophisticated environments (laboratory, outer space or underwater), when performance specifications are known by two-way communication to be nearly exceeded, the device 400, shown in FIG. 3, may receive a final emergency signal to activate instrumentation causing stored media (two part composition media stored within two compartments formed by triple sheet pallet) within the internal cavities of the platform to react to produce temperature lowering, flame diffusing consequences and co-communicating personnel evacuation protocols.

It would normally be appreciated the device 400 and thermographic instrumentation 402 may be powered by first and second supplies, the second power supply such as a solar battery 408 being exteriorly exposed, as for example, upon a detachable plate 410 adjacent the thermoscopic probe 404. The same solar battery power supply may also be developed to power a RF transponder associated with the remote probe 404 to the transmitting receiving device 400 protectively located within the interior of the thermoformed article. Although wireless communication from probe 404 to device 400 is suggested, the arrangement can be substituted with a hard line circuit placed inside the pallet during the thermoforming process.

Referring back to FIGS. 1 and 10, it may also be observed that the pallets embodied in the present drawings include ergonomic features that are present to assist the warehouse worker manually handle a pallet. In FIG. 1, a pair of handles 320 are provided to allow the worker to manipulate the nesting pallet 80. It may also be appreciated that when the pallet 80 is manipulated it will be dragged upon the floor at the legs 12 at the opposite end thereof. In order to prevent the legs 12 from thinning due to long-term abrasion skid plates 322 are offered.

In the alternate embodiment represented in FIG. 10, handle structures 320a and 320b are also shown. Opposite said handles upon the load distributing platform 90 is a skid plate strip 324 that is provided to provide resiliency to pallet 10. It may also be suggested that the handles 320 may take other forms, and may for example be retractable from the side wall 16 position, or may involve a hand size cut out adjacent a pallet margin where the sheets forming the pallet are compressed together to form such sections amenable for said hand cut outs. It may also be advantageous to provide handles and plate along a plurality of pallet margins for ease of use.

Referring again to the distribution system, it is the case that goods supported upon a pallet are unitized into single loads. The unit loads are often times provided with a wrapping to protect and seal or a banding to contain the associated cargo. In the case of wrapping a unit load, the preferred industry method is to unfurl a stretch film around the unit load. In order to initiate this mode of wrapping, the film must be secured in some manner so that the film can be stressed around an adjacent corner to desired effect.

Figure 17:
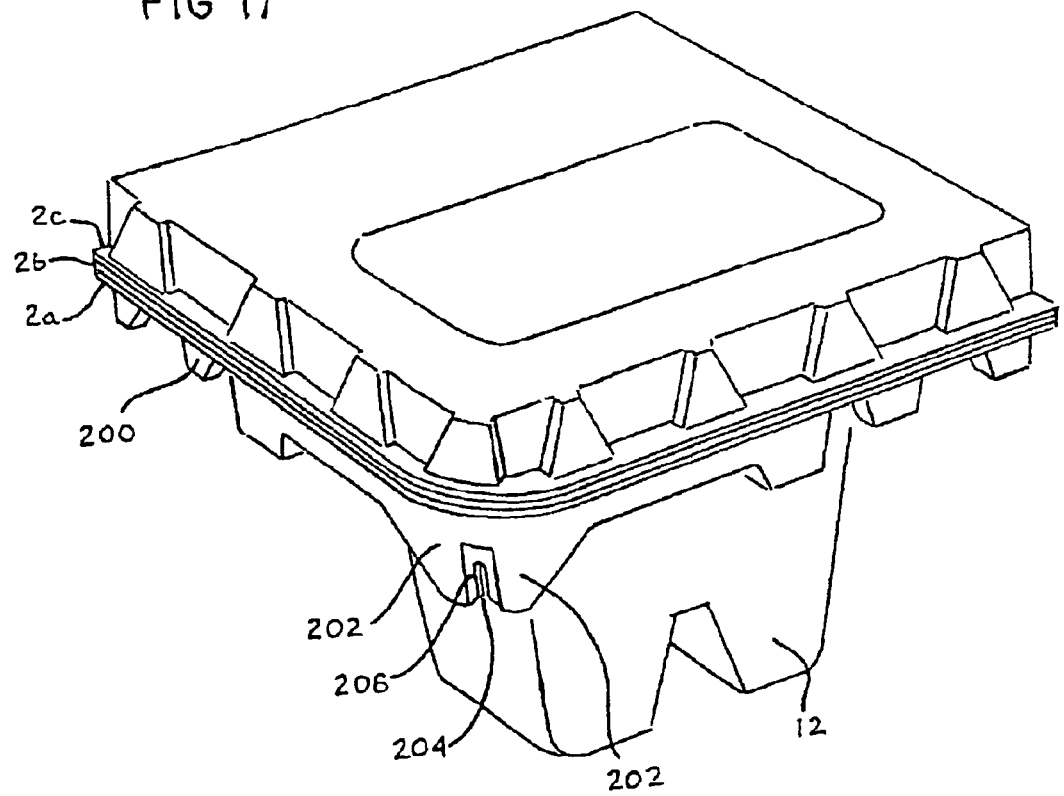
FIG. 17 is a fragmentary isometric view of a nesting pallet member, illustrating a corner notch for receiving a segment of shrink wrap film for unitizing a pallet load.

The present embodiment suggested in FIGS. 2 and 10, and further suggested in FIG. 17, includes pockets 200, which depend downward about the corner regions 20. Two pocket styles are shown. A first style of pocket 200a is associated with corner region of sheets 2a and 2b. In the present example, a web 204 is formed between side-by-side corner pockets 202. The web 204 is opened up in secondary operation, such as by routing. The film is knotted and wedged within the opening 206 of the web. The knotted film end is held in place by the associated opening 206 when the roll of shrink-wrap film is unfurled around the unit load. (The opening in the web is added when the legs receive the drain holes.)

In another embodiment, the plastic deforms over the side-by-side corner pockets, and no webbing occurs, as in FIG. 2. The end of the film is knotted and twisted around the pockets in an ∞ (eight) motion, which secures the film so that it may be unfurled around the adjacent corners of the unit load. The isolated pockets 208 suggested along the region 18 between the legs are contemplated as a serrated border that is operable to engage the stretch wrap film as it is deployed for the desired purpose. The pockets 200 and 208 along the margin of pallet may also be adapted to retain banding in a desired location about the unit load. Similarly, the pockets may be developed to restrain the ends of tensionable straps used to unitize a load.

As seen in FIG. 10, the corner pockets 200 may also be added as secondary pieces 210 after the pallet has been thermoformed. With this arrangement, the pieces 210 could be replaced from time to time as these wear after repeated use or as a result of abuse in the pallet environment. The skid plates 322 and 324 may also be replaced at the same time as part of a pallet maintenance regimen.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A fire resistant pallet comprising:
   a pallet assembly having an exterior surface,
   a fire resistant layer, and
   said fire resistant layer co-extruded upon said exterior surface of said pallet assembly, said pallet member being molded from a sheet of plastic made of a first liquid melt stream containing fire retardants including intumescent materials and a second liquid melt stream substantially excluding fire retardant materials, and said second liquid melt stream being 2 to 6 times thicker than said first liquid melt stream.

2. A fire resistant pallet as set forth in claim 1 which includes,
   said pallet assembly being made of a polyolefin resin, and
   said fire resistant layer being made of an intumescent polyolefin material.

3. A fire resistant pallet as set forth in claim 2 which includes,
   said intumescent polyolefin material being disposed only on said exterior surface of said pallet assembly.

4. A fire resistant pallet as set forth in claim 1 which includes,
   said fire resistant layer includes a moldable intumescent polyolefin composition resistant to fire, and
   said intumescent polyolefin composition being co-extruded with a least a portion of said pallet assembly.

5. A fire resistant pallet comprising:
   at least a first layer of moldable intumescent material,
   a second layer of moldable polyolefin material, and
   said first and second layers being co-extruded together prior to being molded into the fire resistant pallet, said pallet member being molded from a sheet of plastic made of a first liquid melt stream containing flame retardant material and a second liquid melt stream substantially excluding flame retardant material, and said second liquid melt stream being 2 to 6 times thicker than said first liquid melt stream.

6. A fire resistant pallet as set forth in claim 5 which includes,
said moldable intumescent material of said first layer containing a polyolefin material.

7. A fire resistant pallet comprising:
a first moldable mixture of intumescent materials including polyethylene resin,
a second moldable mixture of polyethylene resin,
said first moldable mixture co-extruded over said second moldable mixture, and
said first moldable mixture being exposed upon a surface of the pallet, said first moldable mixture made of a first liquid melt stream including intumescent materials and said second moldable mixture made of a second liquid melt stream substantially excluding intumescent material, and said second liquid melt stream being 2 to 6 times thicker than said first liquid melt stream.

8. A fire resistant pallet as set forth in claim 7 in which,
said first moldable mixture of intumescent materials formed in a sheet construction having a 4:1 draw ratio to form a deep leg pocket.

9. A fire resistant pallet comprising:
a pallet assembly having a molded polyolefin interior structure for supporting a load thereon and an outer layer, a plurality of co-extruded polyolefin sheets forming said molded polyolefin interior structure and said outer layer,
said pallet assembly includes a pallet shell having a first shell half formed from a first member and a second shell half formed from a second member,
said outer layer surrounding said pallet shell,
said molded polyolefin interior structure forming a support structure disposed between and instantly fused to said first shell half and said second shell half to provide support for said pallet shell,
said support structure extending across a length of the said pallet shell,
said outer layer surrounding said molded polyolefin interior structure forming an exterior surface,
said exterior surface including a fire resistant material having fire resistance relative to said molded polyolefin interior structure, and
said exterior surface being co-extruded over said molded polyolefin interior structure.

10. A fire resistant pallet as set forth in claim 9 in which,
said fire resistant material includes intumescent material.

11. A fire resistant pallet as set forth in claim 9 in which,
said outer layer includes a polyolefin material composition with intumescent material disposed thereon to form said exterior surface.

12. A fire resistant pallet as set forth in claim 9 which includes,
said fire resistant material providing thermal insulating properties for said molded polyolefin interior structure.

13. A fire resistant pallet comprising:
a pallet assembly including at least one pallet member having an external surface,
said pallet member having an inner layer with moldable polyolefin material and an outer layer with a mixture of moldable polyolefin material and intumescent material, and
said inner layer and said outer layer being co-extruded to form a fire resistant surface on said external surface of said pallet member, said outer layer being moldable from a sheet of plastic made of a first liquid melt stream containing intumescent materials and said inner layer molded from a sheet of plastic made of a second liquid melt stream substantially excluding intumescent material, and said second liquid melt stream being 2 to 6 times thicker than said first liquid melt stream.

14. A fire resistant pallet as set forth in claim 13 which includes,
said inner layer and said outer layer being formed from recyclable materials.

15. A pallet assembly comprising:
at least one pallet member having external surfaces,
a flame retardant material,
said flame retardant material being co-extruded to said at least one pallet member so as to substantially cover all of said external surfaces of said pallet member,
said flame retardant material being composed of a composite including polyethylene and intumescent materials, said pallet member being molded from a sheet of plastic made of a first liquid melt stream containing the flame retardant material and a second liquid melt stream substantially excluding flame retardant material, and
said second liquid melt stream being 2 to 6 times thicker than said first liquid melt stream.

16. A pallet assembly comprising:
at least one pallet member having external surfaces,
a flame retardant material,
said flame retardant material being co-extruded to said at least one pallet member so as to substantially cover all of said external surfaces of said pallet member,
said flame retardant material being composed of a composite material including a polymer material integrated with one or more water-vapor generating intumescent materials,
said intumescent materials comprising between about 0.0% and 25% weight of said composite, said pallet member being molded from a sheet of plastic made of a first liquid melt stream containing the intumescent materials and a second liquid melt stream substantially excluding the intumescent material, and
said second liquid melt stream being 2 to 6 times thicker than said first liquid melt stream.

17. A method of fire retarding a pallet assembly comprising the steps of:
providing a pallet assembly including at least one pallet member having external surfaces,
co-extruding a flame retardant liquid including an intumescent material to said at least one pallet member so as to substantially cover all of said external surfaces of said pallet member,
liquifying the flame retardant for melt processing by extrusion over a sheet precursor of the pallet member, said pallet member being molded from a sheet of plastic made of a first liquid melt stream containing the intumescent material and a second liquid melt stream substantially excluding the intumescent material, and said second liquid melt stream being 2 to 6 times thicker than said first liquid melt stream.

18. A pallet assembly comprising:
at least one pallet member having external surfaces,
a flame retardant material affixed to said at least one pallet member so as to substantially cover all of said external surfaces of said pallet member,
said flame retardant material including a flame retardant liquid comprising an intumescent material,
said pallet member being molded from a sheet of plastic made of a first liquid melt stream containing fire retardants including intumescent materials and a second liquid melt stream substantially excluding fire retardant materials, and said second liquid melt stream being 2 to 6 times thicker than said first liquid melt stream.

19. A twin sheet pallet assembly comprising:

a first co-extruded thermoplastic sheet heated to a heat deformable temperature and molded against a first tooling surface to form a load support component having first exterior and interior surfaces and a second co-extruded thermoplastic sheet heated to a heat deformable temperature and molded against a second tooling surface to form a structural component having second exterior and interior surfaces, said first and second co-extruded thermoplastic sheets each including a first layer of polyethylene integrated with a predetermined amount of moldable intumescent composition providing a degree of fire resistance to comply with industry standards and a second layer of polyethylene that is not integrated with the predetermined amount of moldable intumescent composition, said second layers of polyethylene being thicker in cross section than said first layers, and said first layers of polyethylene being positioned against said tooling surfaces during molding to form said exterior surfaces so that upon exposure to a high heat indicative of a fire the predetermined amount of moldable intumescent composition prevents said interior surfaces in said second layers from exceeding the industry standards for commodity and idle pallet storage.

20. A twin sheet pallet assembly as set forth in claim 19 in which, the predetermined amount of moldable intumescent composition being made entirely of non-halogenated substances.

21. A twin sheet pallet assembly as set forth in claim 19 in which, the predetermined amount of moldable intumescent composition first releases at least one of water and gas vapor to lower the peak heat release temperature of said first layers and second to form a char barrier to insulate said interior surfaces so that said interior surfaces do not become a source of ignition exceeding the limits of industry standards.

22. A twin sheet pallet assembly as set forth in claim 19 in which, the moldable intumescent composition includes polyethylene selected from the group consisting of HDPE and LDPE in the range between about 0.86 to 0.97 g/cc and said second layer of polyethylene including HDPE in the range between about 0.94 to 0.97 g/cc.

* * * * *